United States Patent
Qiu et al.

(10) Patent No.: US 11,122,188 B1
(45) Date of Patent: Sep. 14, 2021

(54) IMAGE NOISE REDUCTION DEVICE AND METHOD THEREOF

(71) Applicant: REALTEK SEMICONDUCTOR CORP., Hsinchu (TW)

(72) Inventors: Zhong-Yi Qiu, Hsinchu (TW); Wen-Tsung Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/031,626

(22) Filed: Sep. 24, 2020

(30) Foreign Application Priority Data

May 1, 2020 (TW) .................................. 109114733

(51) Int. Cl.
*H04N 5/217* (2011.01)
*H04N 17/00* (2006.01)
*G06T 5/00* (2006.01)

(52) U.S. Cl.
CPC ........... *H04N 5/2176* (2013.01); *G06T 5/002* (2013.01); *H04N 17/002* (2013.01)

(58) Field of Classification Search
CPC .............................. H04N 5/2176; G06T 5/002
See application file for complete search history.

(56) References Cited

U.S. PATENT DOCUMENTS

| | | | | |
|---|---|---|---|---|
| 6,084,634 A * | 7/2000 | Inagaki | ................ | H04N 5/3454 348/294 |
| 2007/0297025 A1* | 12/2007 | Kato | ..................... | H04N 5/243 358/482 |

FOREIGN PATENT DOCUMENTS

TW 201913563 A 4/2019

* cited by examiner

*Primary Examiner* — Michael E Teitelbaum
(74) *Attorney, Agent, or Firm* — Birch, Stewart, Kolasch & Birch, LLP (57) ABSTRACT

An image noise reduction device and method thereof are provided. The method includes: receiving an original image, where the original image includes a plurality of image pixels, each of the image pixels has an image pixel value and a fixed noise value, and the fixed noise value includes a decimal; obtaining a bit-shifted image pixel value, a bit-shifted fixed noise value, and a random number according to a number of bits of the decimal, the image pixel values, and the fixed noise values; obtaining a bit-shifted noise-reduced image pixel value according to the bit-shifted image pixel value, the bit-shifted fixed noise value, the random number, and a reduction equation; obtaining a noise-reduced image pixel value according to the number of bits of the decimal and the bit-shifted noise-reduced image pixel value; and obtaining a noise-reduced image according to the noise-reduced image pixel value.

8 Claims, 7 Drawing Sheets

IMAGE NOISE REDUCTION DEVICE AND METHOD THEREOF

CROSS-REFERENCE TO RELATED APPLICATION

This non-provisional application claims priority under 35 U.S.C. § 119(a) to patent application Ser. No. 10/911,4733 in Taiwan, R.O.C. on May 1, 2020, the entire contents of which are hereby incorporated by reference.

BACKGROUND

Technical Field

The present invention relates to an image noise reduction field, and in particular, to an image noise reduction device and method thereof.

Related Art

An image sensor is a device that converts an optical signal into an electrical signal. The image sensor is also called a photosensitive element. Nowadays, in a process of capturing a scene as an image by the image sensor, an image finally generated by the image sensor is affected by a plurality of different noises, such as crosstalk between light rays (such as red light, green light, blue light, and infrared ray) of various frequencies, crosstalk between an element of the image sensor and the light ray, or a noise generated by the element of the image sensor or generated through an operation between the elements. When the image sensor does not apply corresponding reduction to these different noises, distortion of an image generated by the image sensor is often caused, so that there is an error between the image and the scene.

A fixed pattern noise in the image, such as a difference in brightness between columns, is also one of many problems causing distortion of an image. However, a current fixed noise reduction method still cannot effectively resolve a problem of the fixed pattern noise, causing image quality to be seriously affected.

SUMMARY

Based on the foregoing, the present invention provides an image noise reduction device and method thereof.

According to some embodiments, an image noise reduction method is provided, including: receiving an original image, wherein the original image includes a plurality of image pixels, each of the image pixels has an image pixel value and a fixed noise value, and the fixed noise value includes a decimal; obtaining a bit-shifted image pixel value, a bit-shifted fixed noise value, and a random number according to a number of bits of the decimal, the image pixel values, and the fixed noise values; obtaining a bit-shifted noise-reduced image pixel value according to the bit-shifted image pixel value, the bit-shifted fixed noise value, the random number, and a reduction equation of the form: $O=I-F2+R$, wherein O is the bit-shifted noise-reduced image pixel value, I is the bit-shifted image pixel value, F2 is the bit-shifted fixed noise value, and R is the random number; obtaining a noise-reduced image pixel value according to the number of bits of the decimal and the bit-shifted noise-reduced image pixel value; and obtaining a noise-reduced image according to the noise-reduced image pixel value.

According to some embodiments, an image noise reduction device is provided, including a process circuit configured to obtain a noise-reduced image according to an image noise reduction program. The image noise reduction program includes the following: receiving an original image, wherein the original image includes a plurality of image pixels, each of the image pixels has an image pixel value and a fixed noise value, and the fixed noise value includes a decimal; obtaining a bit-shifted image pixel value, a bit-shifted fixed noise value, and a random number according to a number of bits of the decimal, the image pixel values, and the fixed noise values; obtaining a bit-shifted noise-reduced image pixel value according to the bit-shifted image pixel value, the bit-shifted fixed noise value, the random number, and a reduction equation of the form: $O=I-F2+R$, wherein O is the bit-shifted noise-reduced image pixel value, I is the bit-shifted image pixel value, F2 is the bit-shifted fixed noise value, and R is the random number; obtaining a noise-reduced image pixel value according to the number of bits of the decimal and the bit-shifted noise-reduced image pixel value; and obtaining a noise-reduced image according to the noise-reduced image pixel value.

Based on the foregoing, according to some embodiments of the present invention, the image noise reduction device and method thereof may obtain noise-reduced image pixel values according to the fixed noise value of each of the image pixels in the original image and the corresponding random number, and then obtain the noise-reduced image according to the noise-reduced image pixel value. The image noise reduction device and method thereof obtain the bit-shifted image pixel value, the bit-shifted fixed noise value, and the random number according to the number of bits of the decimal of fixed noise value, the image pixel value, and the fixed noise value, and obtain the bit-shifted noise-reduced image pixel value according to the bit-shifted image pixel value, the bit-shifted fixed noise value, the random number, and the reduction equation, and then obtains the noise-reduced image pixel value according to the number of bits of the decimal of the fixed noise value and the bit-shifted noise-reduced image pixel value.

DETAILED DESCRIPTION

The present invention relates to image noise reduction. Although several exemplary implementation modes of the present invention are described in this specification, it should be understood that the present invention may still be implemented in many ways and should not be limited to specific embodiments or specific ways of implementing the following features described below. In other cases, well-known details are not be described or discussed herein again to avoid obscuring the focus of the present invention.

Figure 1:
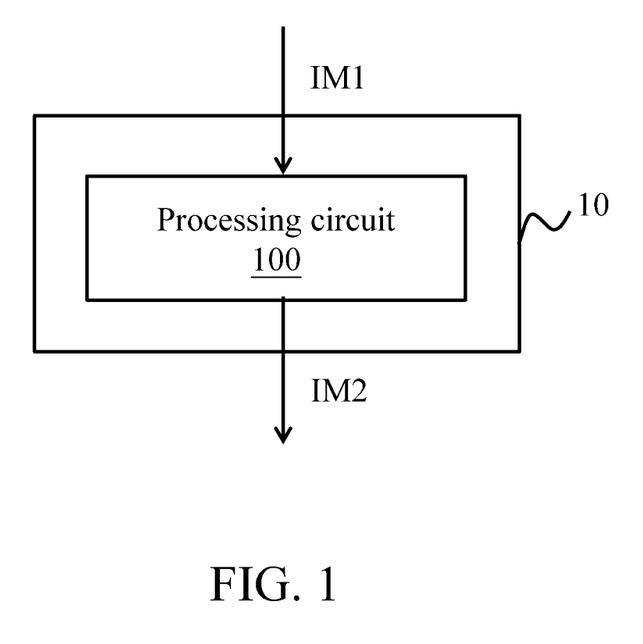
FIG. 1 shows a schematic diagram of an image noise reduction device according to some embodiments of the present invention.
Figure 2:
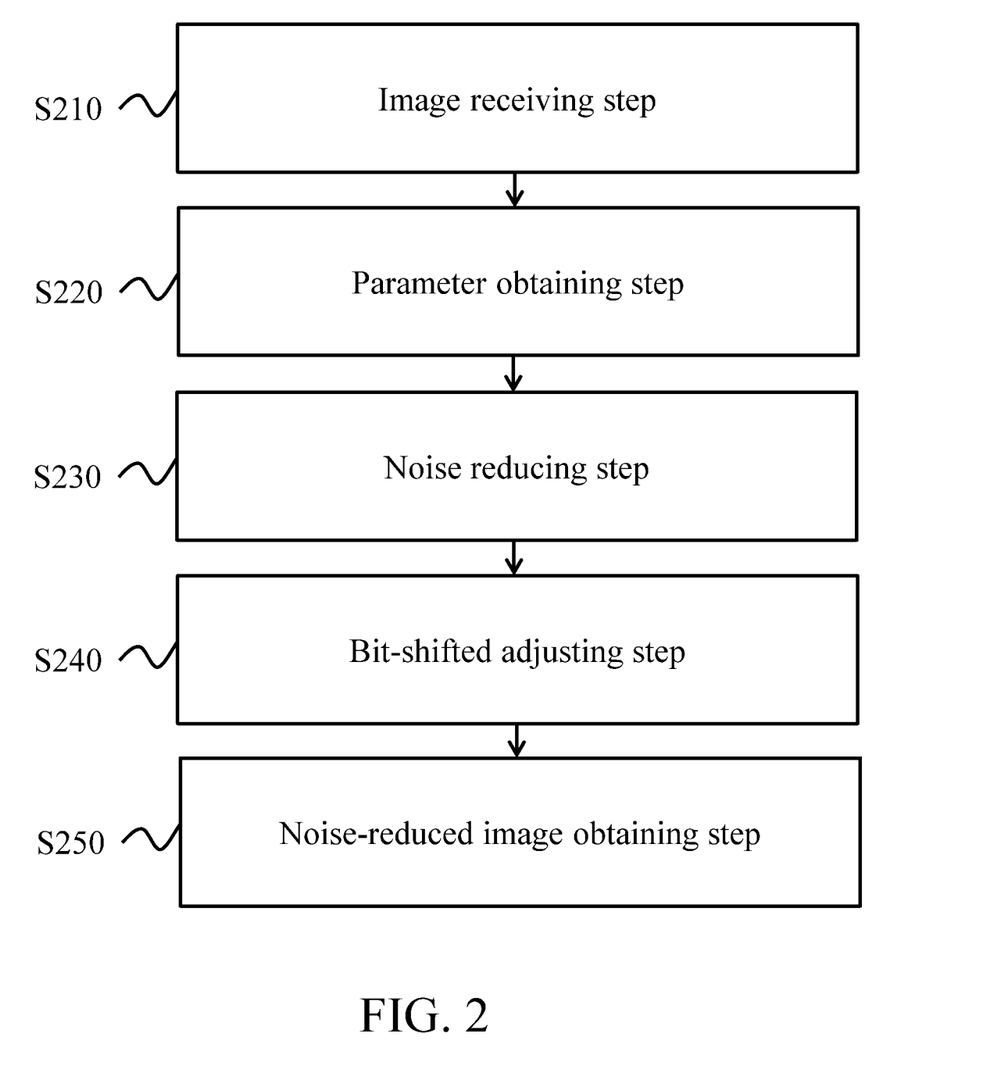
FIG. 2 shows a flowchart of an image noise reduction method according to some embodiments of the present invention.

FIG. 1 shows a schematic diagram of an image noise reduction device 10 according to some embodiments of the present invention. FIG. 2 shows a flowchart of an image noise reduction method according to some embodiments of the present invention. Referring to both FIG. 1 and FIG. 2, in some embodiments, the image noise reduction device 10 includes a processing circuit 100. The processing circuit 100 is configured to obtain a noise-reduced image IM2 according to an image noise reduction program. In particular, the processing circuit 100 implements the image noise reduction program to convert an original image IM1 into the noise-reduced image IM2. The image noise reduction program includes the following steps: an image receiving step (step S210); a parameter obtaining step (step S220); a noise reduction step (step S230); a bit-shifted adjusting step (step S240); and a noise-reduced image obtaining step (step S250).

Figure 3:
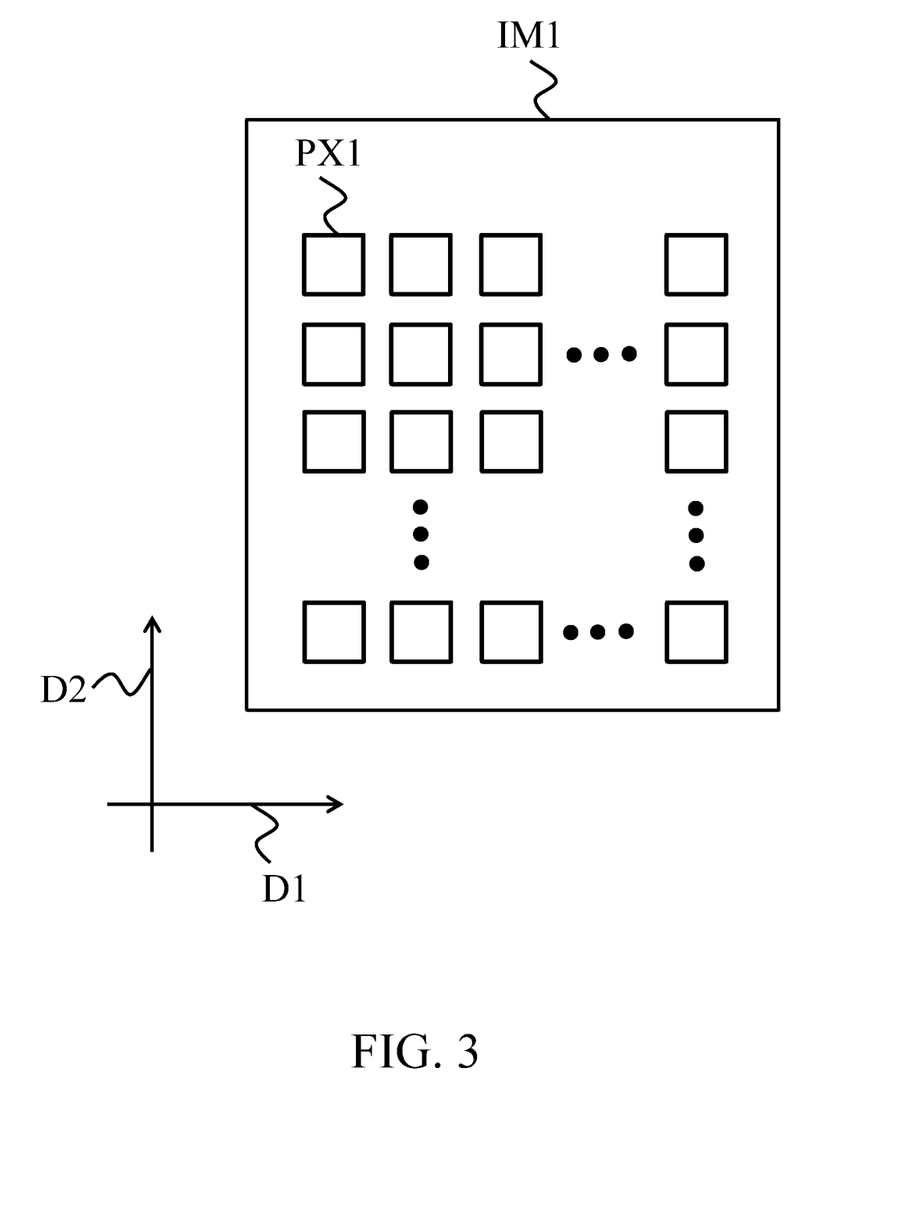
FIG. 3 shows a schematic diagram of an original image according to some embodiments of the present invention.

FIG. 3 shows a schematic diagram of an original image IM1 according to some embodiments of the present invention. Referring to FIG. 1, FIG. 2, and FIG. 3, in some embodiments, the image receiving step (step S210 in FIG. 2) includes the following: receiving the original image IM1 that includes a plurality of image pixels PX1. Each of the image pixels PX1 has an image pixel value and a fixed noise value. The fixed noise value has a decimal. In particular, a fixed noise value received by the processing circuit 100 is a value including an integer and a decimal. A number of bits of the decimal (i.e., precision of the number of bits after a decimal point) may be determined by a user or determined through a preset value in the processing circuit 100. In addition, both the integer and the decimal of the fixed noise value may be expressed in a decimal system or binary system. In other words, the fixed noise value received by the processing circuit 100 may be, for example but not limited to, in the decimal expression or binary expression. For example, in a case that a decimal fixed noise value is "3.6". The integer part is "3" and the decimal part is "6" (in decimal expression). In a case that a binary fixed noise value is "0011.1010". The integer part is "0011" and the decimal part is "1010". In other words, the binary integer and the binary decimal may be represented in a form of 4 bits, but the present invention is not limited thereto. In some embodiments, units of the binary integer and the binary decimal may be different. For example, when the binary fixed noise value is "00000001.1000", the unit of the integer is "8 bits" and the unit of the decimal is "4 bits". When the binary fixed noise value is "01.1000", the unit of the integer is "2 bits" and the unit of the decimal is "4 bits". When the binary fixed noise value is "1.1000", the unit of the integer is "1 bits" and the unit of the decimal is "4 bits". When the binary fixed noise value is "1.10", the unit of the integer is "1 bits", and the unit of the decimal is "2 bits". In some embodiments, the image pixels PX1 are arranged in a two-dimensional array along a first axis D1 and a second axis D2.

In some embodiments, the parameter obtaining step (step S220 in FIG. 2) includes: obtaining a bit-shifted image pixel value, a bit-shifted fixed noise value, and a random number according to a number of bits of the decimal, the image pixel values, and the fixed noise values. In particular, the processing circuit 100 first obtains the number of bits of the decimal (determined by the user or determined according to a preset value) according to a decimal of the fixed noise value. Afterwards, the processing circuit 100 obtains the bit-shifted image pixel value, the bit-shifted fixed noise value, and the random number according to the number of bits of the decimal, the image pixel values, and the fixed noise values. In some embodiments, the processing circuit 100 obtains the number of bits of the decimal according to a unit of the decimal of the fixed noise value. For example, when the unit of the decimal is 4 bits, the number of bits of the decimal is "4". Alternatively, when the unit of the decimal is 8 bits, the number of bits of the decimal is "8".

Figure 4:
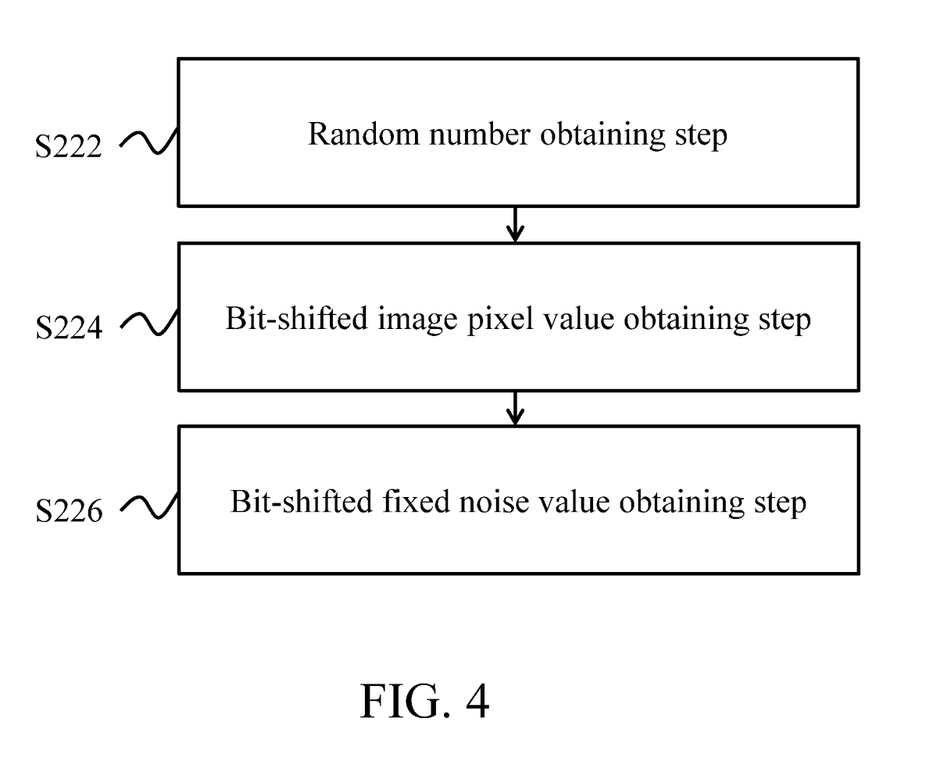
FIG. 4 shows a flowchart of a parameter obtaining method according to some embodiments of the present invention.

FIG. 4 shows a flowchart of a parameter obtaining method according to some embodiments of the present invention. Referring to FIG. 1, FIG. 2, and FIG. 4, in some embodiments, the processing circuit 100 is configured to obtain a bit-shifted image pixel value, a bit-shifted fixed noise value, and a random number through a parameter obtaining program (that is, the parameter obtaining step, step S220 in FIG. 2) according to a number of bits of a decimal, an image pixel value, and a fixed noise value. In particular, the processing circuit 100 implements the parameter obtaining program to convert the number of bits of the decimal, the image pixel values, and the fixed noise values into bit-shifted image pixel values, bit-shifted fixed noise values, and the random number. The parameter obtaining program includes the following steps: a random number obtaining step (step S222); a bit-shifted image pixel value obtaining step (step S224); and a bit-shifted fixed noise value obtaining step (step S226). In particular, an order in which the processing circuit 100 implements step S222, step S224, and step S226 is not limited to the order shown in FIG. 4, and the processing circuit 100 may implement step S222, step S224, and step S226 in an alternative order, or implement step S222, step S224, and step S226, and any combination thereof at the same time or at different time.

In some embodiments, the random number obtaining step (step S222 in FIG. 4) includes: obtaining the random number according to the number of bits of the decimal and a random function. In particular, in some embodiments, the processing circuit 100 obtains the random number according to the number of bits of the decimal and the random function. The random function is, such as but not limited to cyclic redundancy check (CRC). In some embodiments, a range of the random number is $-2^n<R<2^n$, R being the random number, and n being the number of bits of the decimal. In some embodiments, the random number is an integer. In some embodiments, when the number of bits of the decimal is "4", the range of the random number is $-16<R<16$. In other words, the random number is not greater than 16, and not less than −16. For example, a decimal random number may be "9".

In some embodiments, the bit-shifted image pixel value obtaining step (step S224 in FIG. 4) includes: obtaining the bit-shifted image pixel value according to the number of bits of the decimal and the image pixel value. In particular, the processing circuit 100 is configured to shift a decimal point of a binary image pixel value to the right by "the number of bits of the decimal" to obtain the bit-shifted image pixel value. The image pixel value includes an integer value of image pixel and a decimal value of image pixel. For example, when the number of bits of the decimal is "4", and the binary image pixel value is "00100000.0000", that is, the integer value of the binary image pixel is "00100000" and the decimal value of the binary image pixel is "0000", the binary bit-shifted image pixel value is "001000000000". Expressed in a decimal system, when the integer value of the decimal image pixel is "32" and the decimal value of the decimal image pixel is "0", the decimal bit-shifted image pixel is "512". In other words, the processing circuit 100 obtains the bit-shifted image pixel value "001000000000" according to the number of bits "4" of the decimal and the two-bit image pixel value "00100000.0000". In other words, a decimal point of the image pixel value is shifted to the right by "4" bits to obtain the bit-shifted image pixel value.

In some embodiments, the bit-shifted fixed noise value obtaining step (step S226 in FIG. 4) includes: obtaining the bit-shifted fixed noise value according to the number of bits of the decimal and the fixed noise value. In particular, step S226 is similar to step S224, and a difference is that the processing circuit 100 is configured to shift a decimal point of the binary fixed noise value to the right by "the number of bits of the decimal" to obtain the bit-shifted fixed noise value. For example, when the number of bits of the decimal is "4" and the binary fixed noise value is "00000001.1001", that is, the binary integer is "00000001" and the binary decimal is "1001", the binary bit-shifted fixed noise value is "000000011001". Expressed in a decimal system, when a decimal integer is "1" and a decimal expressed in the decimal system is "9", the decimal bit-shifted fixed noise value is "25". In other words, the processing circuit 100 obtains the bit-shifted fixed noise value "000000011001" according to the number of bits "4" of the decimal and the binary fixed noise value "00000001.1001". In other words, the decimal point of the fixed noise value in this example is shifted to the right by "4" bits to obtain the bit-shifted fixed noise value.

In some embodiments, the noise reduction step (step S230 in FIG. 2) includes: obtaining a bit-shifted noise-reduced image pixel value according to the bit-shifted image pixel value, the bit-shifted fixed noise value, the random number, and a reduction equation. The reduction equation is in a form of O=I−F2+R. O is the bit-shifted noise-reduced image pixel value, I is the bit-shifted image pixel value, F2 is the bit-shifted fixed noise value, and R is the random number. In particular, when the processing circuit 100 obtains the bit-shifted image pixel value, the bit-shifted fixed noise value, and the random number, the bit-shifted noise-reduced image pixel value may be obtained based on the reduction equation. In particular, when the processing circuit 100 implements the reduction equation, the processing circuit converts the bit-shifted image pixel value, the bit-shifted fixed noise value, and the random number into the same numerical system (such as a binary system or a decimal system), and then obtains a bit-shifted noise-reduced image pixel value in a corresponding form. In some embodiments, taking a decimal system as an example, a bit-shifted image pixel I is "512", a bit-shifted fixed noise value F2 is "25", and a decimal random number R is "9". The processing circuit 100 obtains a corresponding bit-shifted noise-reduced image pixel value O of "496" according to the reduction equation. Similarly, taking a binary system as an example, when the bit-shifted image pixel I is "001000000000", the bit-shifted fixed noise value F2 is "000000011001", and the random number R is "000000001001", the processing circuit 100 obtains the corresponding bit-shifted noise-reduced image pixel value O of "000111110000" according to the reduction equation.

In some embodiments, the bit-shifted adjusting step (step S240 in FIG. 2) includes: obtaining a noise-reduced image pixel value according to the number of bits of the decimal and the bit-shifted noise-reduced image pixel value. In particular, the processing circuit 100 is configured to shift a decimal point of the binary bit-shifted noise-reduced image pixel value to the left by "the number of bits of the decimal" to obtain the noise-reduced image pixel value. For example, when the number of bits of the decimal is "4" and a binary bit-shifted noise-reduced image pixel value is "000111110000", the binary noise-reduced image pixel value is "00011111.0000". Expressed in a decimal system, when the decimal bit-shifted noise-reduced image pixel value is "496", the decimal noise-reduced image pixel value is "31". In other words, the processing circuit 100 obtains the noise-reduced image pixel value of "00011111.0000" according to the decimal bit number "4" and the binary bit-shifted noise-reduced image pixel value of "000111110000". In other words, a decimal point of the bit-shifted noise-reduced image pixel value is shifted to the left by "4" bits to obtain the noise-reduced image pixel value.

Referring to FIG. 1, FIG. 2, and FIG. 3, the noise-reduced image obtaining step (step S250 in FIG. 2) includes: obtaining a noise-reduced image IM2 according to a noise-reduced image pixel value. In particular, the noise-reduced image IM2 includes a plurality of noise-reduced image pixels. In other words, a manner in which the noise-reduced image pixels are arranged in the noise-reduced image IM2 corresponds to a manner in which image pixels PX1 are arranged in an original image IM1. Each of the noise-reduced image pixels has a corresponding noise-reduced image pixel value. The noise-reduced image pixel value is in a one-to-one correspondence with the image pixel value. Therefore, the processing circuit 100 may obtain the noise-reduced image IM2 according to a noise-reduced image pixel value. In some embodiments, the noise-reduced image pixels are arranged in a two-dimensional array along a first axis D1 and a second axis D2.

Figure 5:
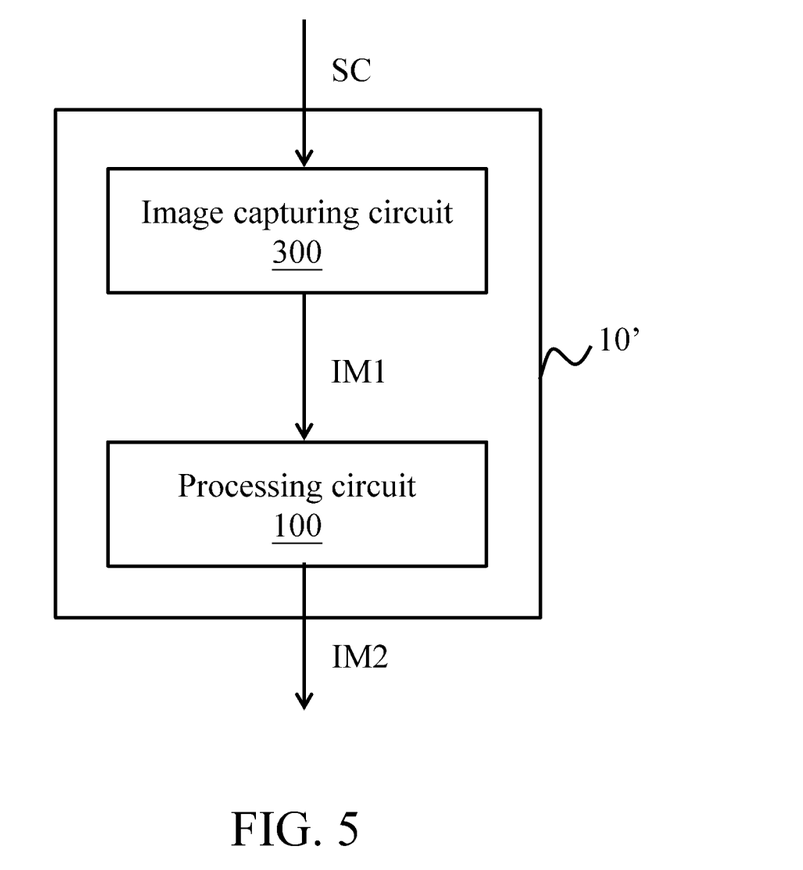
FIG. 5 shows a schematic diagram of an image noise reduction device according to some other embodiments of the present invention.
Figure 6:
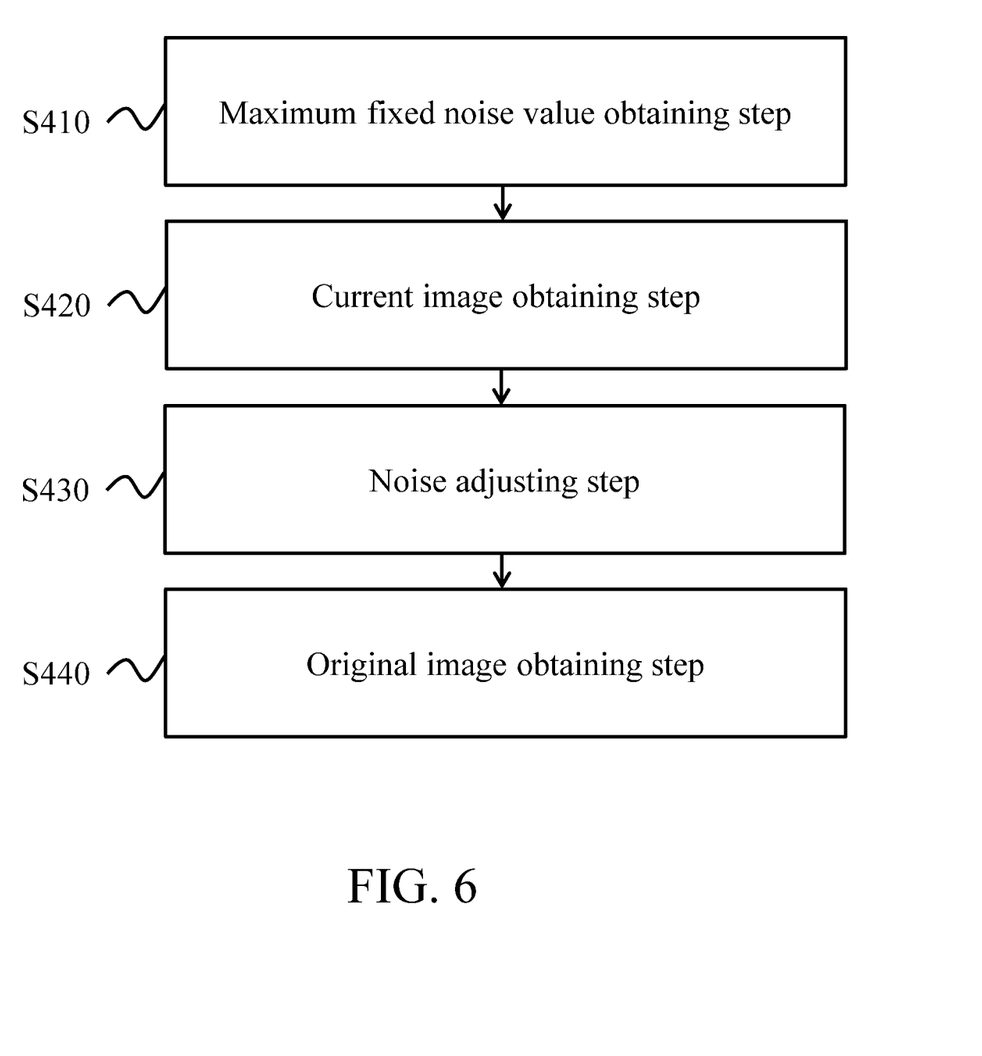
FIG. 6 shows a flowchart of an image capturing method according to some embodiments of the present invention.

FIG. 5 shows a schematic diagram of an image noise reduction device 10' according to some embodiments of the present invention. FIG. 6 shows a flowchart of an image capturing method according to some embodiments of the present invention. Referring to both FIG. 5 and FIG. 6, in some embodiments, relative to the image noise reduction device 10 described in aforementioned embodiment, the image noise reduction device 10' further includes an image capturing circuit 300. The image capturing circuit 300 is coupled to a processing circuit 100. The image capturing circuit 300 is configured to obtain a received original image IM1 according to an image capturing program. In particular, the image capturing circuit 300 implements the image capturing program to capture a scene SC as the original image IM1. In addition, the image capturing circuit 300 transmits the original image IM1 to the processing circuit 100, so that the processing circuit 100 may receive the original image IM1. The image noise reduction program includes the following steps: a maximum fixed noise value obtaining step (step S410); a current image obtaining step (step S420); a noise adjusting step (step S430); and an original image obtaining step (step S440).

Figure 7:
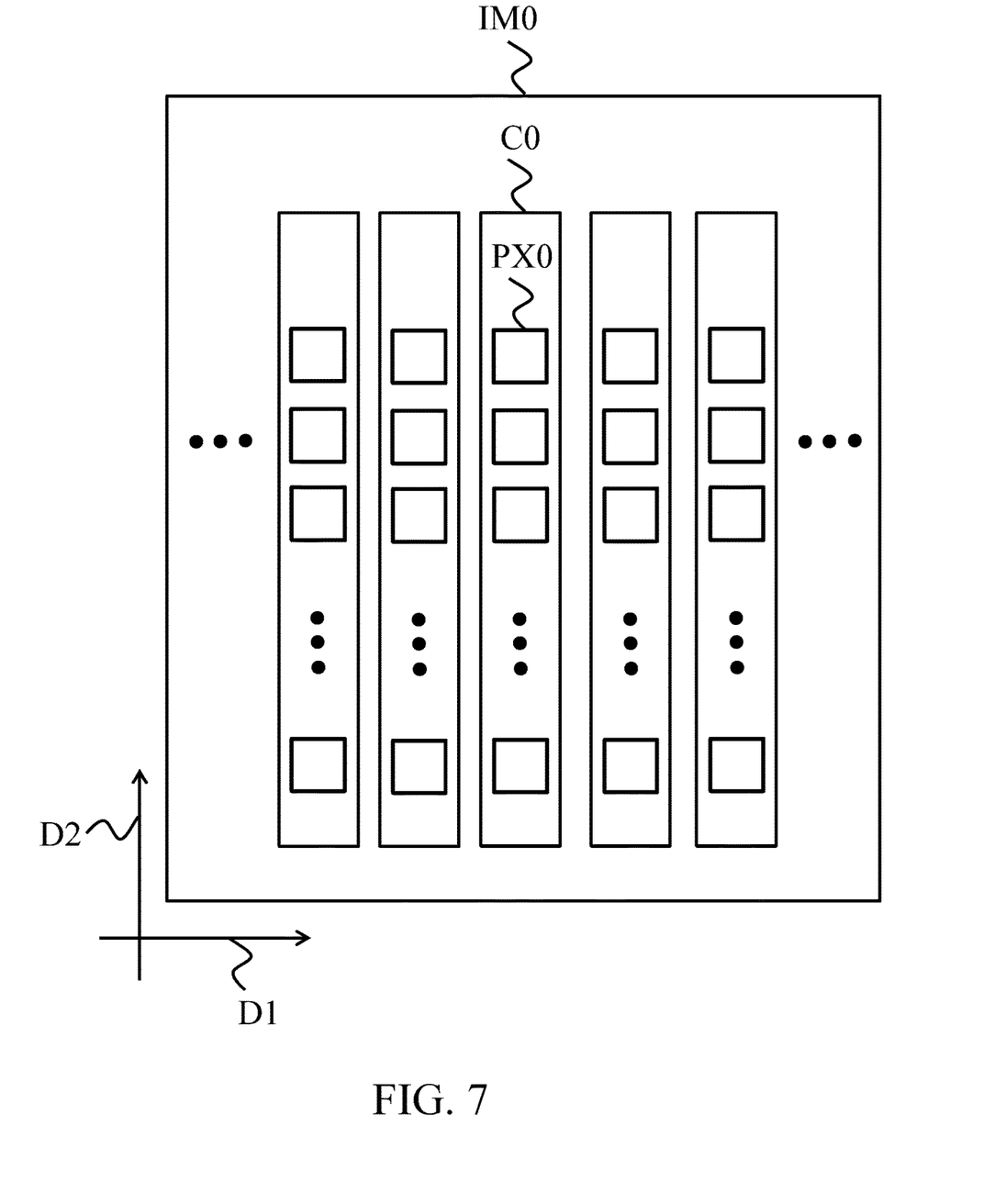
FIG. 7 shows a schematic diagram of an original image according to some other embodiments of the present invention.

FIG. 7 shows a schematic diagram of an original image according to some other embodiments of the present invention. Referring to FIG. 5, FIG. 6, and FIG. 7, in some embodiments, the maximum fixed noise value obtaining step (step S410 in FIG. 6) includes: setting an amplified gain of an image capturing circuit 300 to a maximum gain, and capturing a tested image IM0 for a scene SC. The tested image IM0 includes a plurality of tested pixels PX0. The tested pixels PX0 correspond to the image pixels PX1, and each of the test pixels PX0 has a maximum fixed noise value. In particular, the amplified gain of the image capturing circuit 300 may be set to a value between the maximum gain and a minimum gain. The maximum gain is a maximum value of the amplified gain, and the minimum gain is a minimum value of the amplified gain. When the amplified gain of the image capturing circuit 300 is set to the maximum gain, an image captured by the image capturing circuit 300 for the scene SC is the tested image IM0. Each of the tested pixels PX0 has a maximum fixed noise value, that is, each of the test pixels PX0 has a corresponding maximum fixed noise value. Herein, the tested pixels PX0 in the tested image IM0 is in one-to-one correspondence with the image pixels PX1 in the original image IM1, and a manner in which the test pixels PM0 are arranged corresponds to a manner in which the image pixels PX1 are arranged. In some embodiments, the "maximum fixed noise value" of the tested pixel PX0 is the "maximum column-fixed noise value", that is, each of the test pixels PX0 located in a same "column" has the same "maximum column-fixed noise value".

In some embodiments, the current image obtaining step (step S420 in FIG. 6) includes: setting the amplified gain of the image capturing circuit 300 to a current gain, and capturing a current image for the scene SC. In particular, the current gain is an amplified gain between the maximum gain and the minimum gain. When the amplified gain of the image capturing circuit 300 is set to the current gain, an image captured by the image capturing circuit 300 for the scene SC is the current image. Therefore, when the current gain is equal to the maximum gain, the current image is the tested image IM0.

In some embodiments, the image capturing circuit 300 may dynamically adjust the current gain, such as but not limited to the following examples: the image capturing circuit 300 dynamically adjusts the current gain according to background brightness of the scene SC. For example, when the background brightness of the scene SC is relatively dark, the image capturing circuit 300 may increase the current gain, so that the captured current image is not insufficiently bright due to the relatively dark background bright. Similarly, when the background brightness of the scene SC is relatively bright, the image capturing circuit 300 may lower the current gain. When automatic exposure set by the image capturing circuit 300 itself reaches a maximum value or a minimum value, the image capturing circuit 300 dynamically adjusts the current gain to supplement the brightness of the current image. The image capturing circuit 300 dynamically adjusts the current gain according to an adjustment instruction of other circuits of the image noise reduction device 10'. For example, when other circuits are the processing circuits 100, the processing circuit 100 outputs different adjustment instructions according to different image capturing circuits 300 because current images obtained by different image capturing circuits 300 may have different fixed noise values.

In some embodiments, the noise adjusting step (step S430 in FIG. 6) includes: obtaining a fixed noise value corresponding to each of the image pixels PX1 according to a noise adjustment equation. The noise adjustment equation is: F1=(C/M)*F0. F1 is the fixed noise value, C is the current gain, M is the maximum gain, and F0 is the maximum fixed noise value. In particular, the fixed noise value corresponds to the current gain, and the fixed noise value changes correspondingly according to variations of the current gain of the image capturing circuit 300. Therefore, the image capturing circuit 300 may obtain a corresponding fixed noise value based on the fixed noise value corresponding to each of the image pixels PX1, the current gain, and the maximum gain. Because a maximum current gain is the maximum gain, and a minimum current gain is the minimum gain, a value of a result obtained through "the current gain divided by the maximum gain C/M" is between 0 and 1. In some embodiments, the current gains and the maximum gains of the image pixels PX1 in the same original image IM1 are identical. In other words, each of the image pixels PX1 in the same original image IM1 corresponds to the value of a result obtained through "the current gain divided by the maximum gain C/M".

In some embodiments, the original image obtaining step (step S440 in FIG. 6) includes: obtaining the original image IM1 according to the current image and the fixed noise value corresponding to each of the image pixels PX1. In particular, the current image is the original image IM1 without a fixed noise value. Therefore, the image capturing circuit 300 may obtain the original image IM1 according to the current image and the fixed noise value corresponding to each of the image pixels PX1.

Referring to both FIG. 5 and FIG. 7, in some embodiments, the image capturing circuit 300 is configured to obtain a maximum column-fixed noise value corresponding to each of tested pixels PX0 according to a column-fixed noise value obtaining program. In particular, the maximum column-fixed noise value is a maximum fixed noise value with a "column" as a unit, that is, the maximum fixed noise value of each of the tested pixels PX0 located in the same "column" is the maximum column-fixed noise value. The column-fixed noise value obtaining program includes step S510 to step S550 (not shown in the figure) shown below:

In some embodiments, step S510 includes: setting an amplified gain of the image capturing circuit 300 to a maximum gain, and capturing a plurality of tested images IM0 for the scene SC. In particular, the tested image IM0 includes a plurality of columns C0. Each of the columns C0 is parallel to a second axis D2, and each of the columns C0 has a plurality of tested pixels PX0. In some embodiments, background brightness of the scene SC used for obtaining the plurality of tested images IM0 is low brightness. The low brightness means that the background brightness has an illuminance below 10 lux.

In some embodiments, step S520 includes: averaging a sum of each of the tested images IM0 according to an average equation to obtain an average tested image. The average equation is of the form $$T = \frac{\sum Ti}{N}.$$

T is the average tested image, Ti is an $i^{th}$ tested image IM0, and N is a total number of tested images IM0 whose sum is calculated. In particular, this step is used for eliminating general noise interference.

In some embodiments, step S530 includes: obtaining a single-column average pixel value according to a single-column average pixel value obtaining formula, a tested pixel value of each of the test pixels PX0, and a number of tested pixels PX0 in each column C0. The single-column average pixel value obtaining formula is of the form $$C_x = \frac{\sum T(x, y)}{H},$$

Cx being the single-column average pixel value, T (x, y) being the tested pixel value of the tested pixel PX0 located at coordinates (x, y), and H being the number of tested pixels PX0 in each column C0.

In some embodiments, step S540 includes: obtaining a column-adjacent area pixel value of each column C0 according to a column-adjacent area pixel value obtaining formula, a single-column average pixel value, and a width between column-adjacent areas. The column-adjacent area pixel value obtaining formula is of the form $$E_x = * \frac{\sum_{x-w}^{x+w} Cx}{2*w+1},$$

w being the width between the column-adjacent areas, and Cx being the single-column average pixel value. For example, when the width w between the column-adjacent areas is 2, a column-adjacent area pixel value of a "5"$^{th}$ column E5=(C3+C4+C5+C6+C7)/5, and C3-C7 are single-column average pixel values from a "3"$^{rd}$ column to a "7"$^{th}$ column.

In some embodiments, step S550 includes: obtaining a maximum column-fixed noise value for each column C0 according to a maximum column-fixed noise value obtaining formula, a single-column average pixel value, and a column-adjacent area pixel value. The maximum column-fixed noise value obtaining formula is Fx=Cx−Ex, Fx being the maximum column-fixed noise value, Cx being the single-column average pixel value, and Ex being the column-adjacent area pixel value.

In some embodiments, the image noise reduction device 10 is configured in a terminal apparatus, such as but not limited to a mobile phone, a tablet computer, a notebook computer, a desktop computer, a camera apparatus, or a smart wearable apparatus.

In some embodiments, the image noise reduction device 10 further includes an image display device and a storage device. The image display device is configured to display a noise-reduced image IM2. The image display device is, for example but not limited to, a liquid crystal display, a light emitting diode display, and an organic light emitting diode display. The storage device is configured to store a tested image IM0, an original image IM1, a noise-reduced image IM2, and the foregoing various values and signals. The storage device is such as but not limited to a volatile memory, a read-only memory, a flash memory, and a magnetic disk.

In some embodiments, each of the image pixels PX1 may have not only one but a plurality of image pixel values, that is, the image pixel value is such as but not limited to red light, green light, blue light, or infrared ray. The image noise reduction device 10 and the image noise reduction method may be adapted to different color spaces, such as but not limited to a gray color space, an RGB color space, a YUV color space, and an RAW format color space, etc.

Based on the foregoing, in some embodiments of the present invention, the image noise reduction device and method thereof may obtain each of the corresponding noise-reduced image pixel values according to the fixed noise value of each of the image pixels in the original image and the corresponding random number, and then obtain the noise-reduced image according to the noise-reduced image pixel value. The image noise reduction device and method thereof obtain the bit-shifted image pixel value, the bit-shifted fixed noise value, and the random number according to the number of bits of the decimal of fixed noise value, the image pixel value, and the fixed noise value, and obtain the bit-shifted noise-reduced image pixel value according to the bit-shifted image pixel value, the bit-shifted fixed noise value, the random number, and the reduction equation, and then obtains the noise-reduced image pixel value according to the number of bits of the decimal of the fixed noise value and the bit-shifted noise-reduced image pixel value. In some embodiments, the image noise reduction device and method thereof implements, according to the number of bits of the decimal of the fixed noise value, the random function to obtain the random number, shifts the decimal point of the image pixel value to obtain the bit-shifted image pixel value, shifts the decimal point of the fixed noise value to obtain the bit-shifted fixed noise value, and shifts the decimal point of the bit-shifted noise-reduced image pixel value to obtain the noise-reduced image pixel value. In some embodiments, according to the image noise reduction device and method thereof, the random number and shift of the decimal points may be used to prevent distortion of the original image during reduction of the fixed pattern noise, especially distortion of an image due to ignoring of calculation of the decimal of the fixed noise value. Therefore, a noise-reduced image with low fixed pattern noise may be obtained according to the image noise reduction device and method thereof.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image noise reduction method, comprising:
receiving an original image, wherein the original image comprises a plurality of image pixels, each of the image pixels has an image pixel value and a fixed noise value, and the fixed noise value comprises a decimal;
obtaining a bit-shifted image pixel value, a bit-shifted fixed noise value, and a random number according to a number of bits of the decimal, the image pixel values, and the fixed noise values;
obtaining a bit-shifted noise-reduced image pixel value according to the bit-shifted image pixel value, the bit-shifted fixed noise value, the random number, and a reduction equation of the form:

$O=I-F2+R$, wherein

O is the bit-shifted noise-reduced image pixel value, I is the bit-shifted image pixel value, F2 is the bit-shifted fixed noise value, and R is the random number;
obtaining a noise-reduced image pixel value according to the number of bits of the decimal and the bit-shifted noise-reduced image pixel value; and
obtaining a noise-reduced image according to the noise-reduced image pixel values;
wherein the image noise reduction method further comprises a parameter obtaining program, wherein the bit-shifted image pixel value, the bit-shifted fixed noise value, and the random number are obtained through the parameter obtaining program according to the number of bits of the decimal, the image pixel values, and the fixed noise values, the parameter obtaining program comprising:
obtaining the random number according to the number of bits of the decimal and a random function;

obtaining the bit-shifted image pixel value according to the number of bits of the decimal and the image pixel value; and obtaining the bit-shifted fixed noise value according to the number of bits of the decimal and the fixed noise value.

2. The image noise reduction method according to claim 1, wherein a range of the random number is $-2^n<R<2^n$, R being the random number, and n being the number of bits of the decimal.

3. The image noise reduction method according to claim 1, wherein when the number of bits of the decimal is 4, a range of the random number is $-16<R<16$.

4. The image noise reduction method according to claim 1, further comprising an image capturing method used for obtaining the received original image, the image capturing method comprising:

setting an amplified gain of an image capturing circuit to a maximum gain, and capturing a tested image for a scene, the tested image comprising a plurality of tested pixels, the tested pixels corresponding to the image pixels, and each of the tested pixels having a maximum fixed noise value;

setting the amplified gain of the image capturing circuit to a current gain, and capturing a current image for the scene;

obtaining the fixed noise value corresponding to each of the image pixels according to a noise adjustment equation of the form:

$F1=(C/M)*F0$, wherein

F1 is the fixed noise value, C is the current gain, M is the maximum gain, and F0 is the maximum fixed noise value; and obtaining the original image according to the current image and the fixed noise value corresponding to each of the image pixels.

5. An image noise reduction device, comprising:

a processing circuit configured to obtain a noise-reduced image according to an image noise reduction program, the image noise reduction program comprising:

receiving an original image, wherein the original image comprises a plurality of image pixels, each of the image pixels has an image pixel value and a fixed noise value, and the fixed noise value comprises a decimal;

obtaining a bit-shifted image pixel value, a bit-shifted fixed noise value, and a random number according to a number of bits of the decimal, the image pixel values, and the fixed noise values;

obtaining a bit-shifted noise-reduced image pixel value according to the bit-shifted image pixel value, the bit-shifted fixed noise value, the random number, and a reduction equation of the form:

$O=I-F2+R$, wherein

O is the bit-shifted noise-reduced image pixel value, I is the bit-shifted image pixel value, F2 is the bit-shifted fixed noise value, and R is the random number;

obtaining a noise-reduced image pixel value according to the number of bits of the decimal and the bit-shifted noise-reduced image pixel value; and obtaining a noise-reduced image according to the noise-reduced image pixel values;

wherein the processing circuit is configured to obtain the bit-shifted image pixel value, the bit-shifted fixed noise value, and the random number through a parameter obtaining program according to the number of bits of the decimal, the image pixel value, and the fixed noise value, the parameter obtaining program comprising:

obtaining the random number according to the number of bits of the decimal and a random function;

obtaining the bit-shifted image pixel value according to the number of bits of the decimal and the image pixel value; and obtaining the bit-shifted fixed noise value according to the number of bits of the decimal and the fixed noise value.

6. The image noise reduction device according to claim 5, wherein a range of the random number is $-2^n<R<2^n$, R being the random number, and n being the number of bits of the decimal.

7. The image noise reduction device according to claim 5, wherein when the number of bits of the decimal is 4, a range of the random number is $-16<R<16$.

8. The image noise reduction device according to claim 5, further comprising an image capturing circuit configured to obtain the received original image according to an image capturing program, the image capturing program comprising:

setting an amplified gain of an image capturing circuit to a maximum gain, and capturing a tested image for a scene, the tested image comprising a plurality of tested pixels, the tested pixels corresponding to the image pixels, and each of the tested pixels having a maximum fixed noise value;

setting the amplified gain of the image capturing circuit to a current gain, and capturing a current image for the scene;

obtaining the fixed noise value corresponding to each of the image pixels according to a noise adjustment equation of the form:

$F1=(C/M)*F0$, wherein

F1 is the fixed noise value, C is the current gain, M is the maximum gain, and F0 is the maximum fixed noise value; and obtaining the original image according to the current image and the fixed noise value corresponding to each of the image pixels.

* * * * *